Dec. 12, 1967  MITSUNOBU TOYAMA  3,357,201
APPARATUS FOR STORING VEGETABLES
Filed Sept. 19, 1966
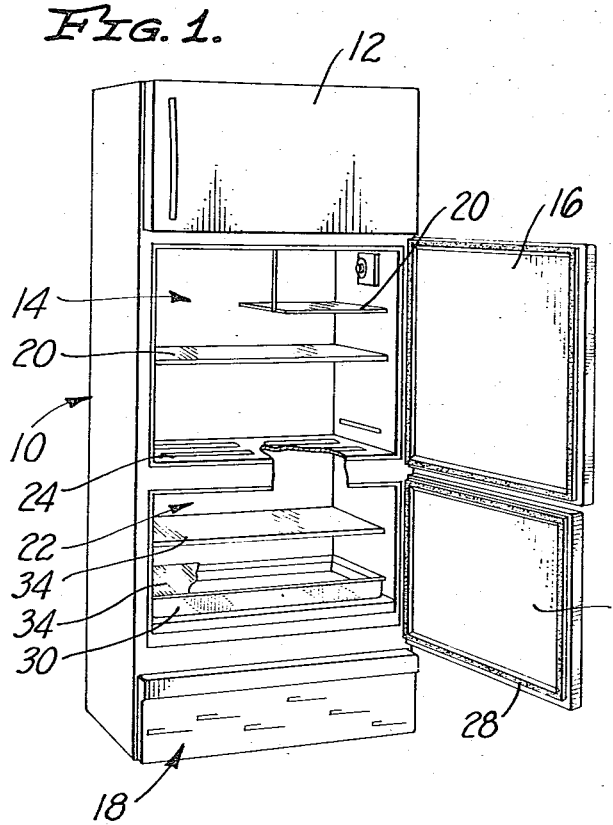
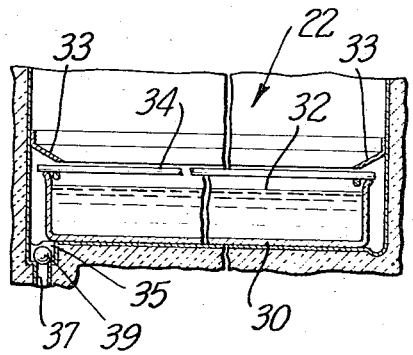
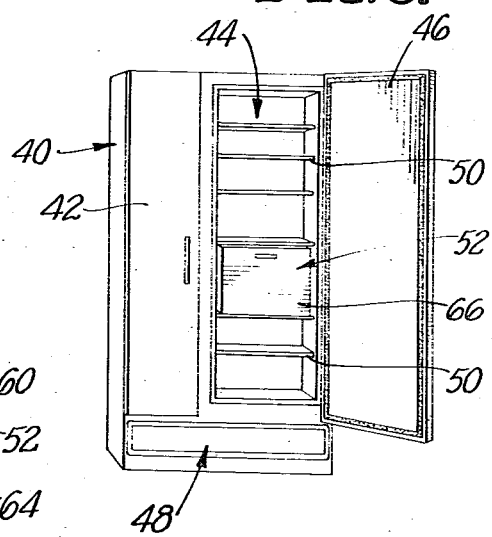
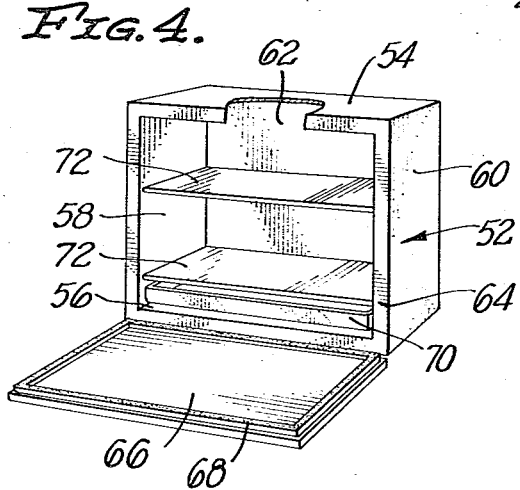
INVENTOR
MITSUNOBU TOYAMA
BY HIS ATTORNEYS
HARRIS, KIECH, RUSSELL & KERN 3,357,201
APPARATUS FOR STORING VEGETABLES
Mitsunobu Toyama, 1551 Verde Vista Drive,
Monterey Park, Calif. 91754
Filed Sept. 19, 1966, Ser. No. 580,261
6 Claims. (Cl. 62—382)

ABSTRACT OF THE DISCLOSURE

A refrigerating apparatus having a refrigerated compartment and a vegetable-storage compartment separated from the refrigerated compartment by a wall having a high coefficient of heat conductivity. The vegetable-storage compartment is sealed relative to the refrigerated compartment to prevent the passage of water vapor from the vegetable-storage compartment to the refrigerated compartment. A water-filled tray in the vegetable-storage compartment maintains the air therein substantially saturated with water vapor.

Background of invention

The present invention relates in general to minimizing deterioration of vegetables during prolonged refrigerated storage by storing the vegetables under temperature and humidity conditions which produce in the vegetables what might be regarded as a state of hibernation or suspended animation.

More particularly, the invention contemplates greatly reducing loss of vitality in vegetables during prolonged refrigerated storage by storing them at a temperature just above freezing, i.e., at a temperature ranging about 34° F. to about 38° F., and by storing them in an atmosphere which is at least substantially saturated with water vapor, i.e., an atmosphere having a relative humidity at or near one hundred percent. Expressed differently, the invention contemplates storing vegetables at a temperature of from about 34° F. to about 38° F. in an atmosphere having a vapor pressure of about 0.0974 p.s.i. to about 0.115 p.s.i.

I have demonstrated that vegetables of all types may be stored under the foregoing conditions of temperature and humidity for surprisingly long periods of time without any visible evidence of deterioration. For example, I have succeeded in storing even easily perishable vegetables, such as green onions, spinach, lettuce, tomatoes, strawberries, and the like, for as long as two months, without loss of vitality. Less perishable vegetables, such as cabbage, celery, cauliflower, cucumbers, and the like, can be kept fresh under such conditions for considerably longer periods.

Summary and objects of invention

The basic object of my invention is to provide a vegetable storage apparatus which is capable of maintaining the foregoing ideal conditions of temperature and humidity in conjunction with conventional refrigerating apparatus, such as an ordinary household refrigerator, having a refrigerated compartment and means for maintaining the temperature within such refrigerated compartment within a range of about 34° F. to about 38° F. Since the invention was originally embodied in, and is particularly applicable to, a vegetable storage apparatus for use in conjunction with an ordinary household refrigerator, it will be considered in such connection herein as a matter of convenience without limiting it thereto.

Considering the invention more specifically, a primary object thereof is to provide a vegetable-storage compartment which may be used in conjunction with the refrigerated compartment of an ordinary refrigerator, preferably of the frostless or frost-free type, to maintain the temperature in the vegetable-storage compartment within a range of from about 34° F. to about 38° F., and to maintain the atmosphere within the vegetable-storage compartment at or near saturation, without interfering with normal operation of the refrigerator, and particularly without elevating the humidity of the atmosphere within the refrigerated compartment, outside the vegetable-storage compartment, above that normally desired in a household refrigerator.

Important objects of the invention are to provide an apparatus wherein the vegetable-storage compartment is separated from the refrigerated compartment by a wall having a high coefficient of heat conductivity so that it conducts heat freely from the vegetable-storage compartment to the refrigerated compartment in extracting heat from the vegetable-storage compartment as required to maintain the temperature of the air in the vegetable-storage compartment within the same range as the temperature of the air within the refrigerated compartment, i.e., within a range of from about 34° F. to about 38° F., wherein the vegetable-storage compartment contains a tray or trays adapted to be filled with water to a predetermined level so as to maintain the air in the vegetable-storage compartment substantially saturated with water vapor, and wherein the vegetable-storage compartment is substantially sealed relative to the refrigerated compartment so as to substantially prevent the passage of water vapor from the vegetable-storage compartment to the refrigerated compartment. A related object is to provide one or more vegetable-storage racks within the vegetable-storage compartment and spaced from the water in the tray therein.

Another object is to provide an apparatus of the foregoing nature wherein the tray or trays are substantially coextensive with and are located at the bottom of the vegetable-storage compartment, and wherein the rack or racks are located in the vegetable-storage compartment above the water level in the tray.

A further object is to provide an apparatus wherein the vegetable-storage compartment is located within and occupies a part of the refrigerated compartment and is separated from the remainder of the refrigerated compartment by the wall mentioned.

Other objects are to provide a vegetable-storage compartment which is either built into the refrigerator, or which is a separate unit installable in and removable from the refrigerated compartment.

Yet another object is to provide a vegetable-storage compartment which is provided with a door and means for substantially sealing the door when it is in its closed position so as to substantially prevent the escape of water vapor from the vegetable-storage compartment into the refrigerated compartment.

The foregoing objects, advantages, features and results of the present invention, together with various other objects, advantages, features and results thereof which will be evident to those skilled in the art in the light of this disclosure, may be achieved with the exemplary embodiments of the invention described in detail hereinafter and illustrated in the accompanying drawing.

Description of drawing

In the drawing:
FIG. 1 is an isometric view of an ordinary household refrigerator which embodies the present invention;
FIG. 2 is a vertical sectional view through a water tray embodied in the invention;
FIG. 3 is an isometric view of another household refrigerator which embodies the invention; and
FIG. 4 is an isometric view of a removable vegetable-storage compartment which embodies the invention.

Description of preferred embodiments of invention

Referring initially to FIG. 1 of the drawing, designated generally therein by the numeral 10 is a refrigerator identical in most respects to a common type of ordinary household refrigerator, preferably of the frostless or frost-free type.

More particularly, the refrigerator 10 includes an upper, freezing compartment provided with a door 12. Below the freezing compartment is a refrigerated compartment 14 provided with a door 16. At the bottom 18 of the refrigerator 10 is a compartment containing conventional means, not shown, for maintaining the freezing compartment at a temperature near 0° F., and for maintaining the refrigerated compartment 14 at a temperature just above freezing, i.e., at a temperature in the range from about 34° F. to about 38° F. As is conventional, the refrigerated compartment 14 is provided with shelves 20 which are preferably in the form of wire racks. As indicated above, the refrigerator 10 is preferably of the frostless or frost-free type so that frost and condensation do not accumulate in the freezing and refrigerated compartments, respectively.

In a conventional refrigerator of the general type illustrated in FIG. 1 of the drawing, the refrigerated compartment 14 would extend downwardly from the freezing compartment to the means for maintaining freezing temperatures in the freezing compartment and temperatures just above freezing in the refrigerated compartment. However, in accordance with the present invention, part of the space which would normally be occupied by the refrigerated compartment 14 is utilized to provide a vegetable-storage compartment 22. The latter is separated from the refrigerated compartment 14 by a horizontal partition or wall 24 which completely isolates the vegetable-storage compartment from the refrigtrated compartment to prevent the interchange of air between the two compartments. The partition 24 is made of a material, such as aluminum, having a high coefficient of heat conductivity so that heat is transferred freely from the vegetable-storage compartment 22 to the refrigerated compartment 14 through the partition. This insures maintaining the temperature of the atmosphere within the vegetable-storage compartment 22 within substantially the same range as the refrigerated compartment 14, i.e., within a range of from about 34° F. to about 38° F.

The vegetable-storage compartment 22, in the particular construction illustrated, is provided with its own separate door 26 forming part of the front of the refrigerator 10. The door 26 is provided with a conventional peripheral seal 28 engageable with the front of the refrigerator cabinet around the front of the vegetable-storage compartment 22 to completely seal the vegetable-storage compartment.

Resting on and substantially coextensive with the bottom of the vegetable-storage compartment 22 is a shallow tray 30 adapted to be filled with water to a level 32 just below the top of the tray. Preferably, the tray 30 is maintained slightly more than three-quarters full. If desired, two or more smaller trays can be substituted for the tray 30 for easier handling. As shown in FIG. 2, drip flanges 33 can be provided for draining condensate back into the tray, there being such a drop flange along each side of the tray.

The bottom of the vegetable-storage compartment 22 may be provided with a trap 35 to receive condensation or spillage reaching the bottom wall of this compartment, such wall preferably sloping slightly toward the trap. A drainage tube 37 leads from the trap 35 to a suitable point of disposal, such as the means, not shown, for evaporating water into the atmosphere in a conventional frostless or frost-free type of refrigerator. Preferably, a floating check valve 39 controls flow through the drainage tube 37.

In addition to the water tray 30, the vegetable-storage compartment 22 contains vegetable-storage shelves 34, preferably in the form of wire racks. As shown in FIG. 2, the lowermost shelf 34 may rest on the water tray 30, any vegetables on this shelf being spaced above the water level 32.

When the refrigerator 10 is in operation, the high-heat-conductivity partition 24 serves to maintain the temperature of the atmosphere in the vegetable-storage compartment 22 substantially within the same range as the temperature of the atmosphere within the refrigerated compartment 14, i.e., within a range of from about 34° F. to about 38° F. The large exposed surface of the water in the tray 30 insures that the atmosphere within the vegetable-storage compartment 22 is substantially saturated with water vapor at all times so that the relative humidity is at or near one hundred percent. However, since the vegetable-storage compartment 22 is completely separated from the refrigerated compartment 14 by the partition 24, the high-relative-humidity at atmosphere within the vegetable-storage compartment is confined to this compartment and no water vapor from the vegetable-storage compartment can enter the refrigerated compartment 14. Consequently, the humidity in the refrigerated compartment 14 can readily be maintained at the level conventional for refrigerated storage of most food stuffs.

I have found that the temperature range of about 34° F. to about 38° F. in the vegetable-storage compartment 22, in combination with an atmosphere in this compartment substantially saturated with water vapor, provides an ideal environment for the prolonged storage of even very perishable vegetables without evidence of deterioration or loss of vitality. As previously indicated, I have found that even very perishable vegetables can be stored satisfactorily for as long as two months, while less perishable vegetables can be stored for even longer periods without visible deterioration.

Turning now to FIGS. 3 and 4 of the drawing, illustrated in FIG. 3 is another conventional type of refrigerator 40 having along one side thereof a vertical freezing compartment provided with a door 42. Adjacent the freezing compartment is a vertical refrigerated compartment 44 provided with a door 46. At the bottom 48 of the refrigerator 40 is a compartment containing conventional means, not shown, for maintaining the freezing compartment at a temperature around 0° F. and for maintaining the temperature in the refrigerated compartment 44 within a range of about 34° F. to about 38° F. The refrigerated compartment 44 is provided with shelves 50, preferably of the wire rack type.

Within the refrigerated compartment 44, in the space normally occupied by shelves corresponding to the shelves 50, is a vegetable-storage compartment 52 which is a separate unit installable in and removable from the refrigerated compartment. The vegetable-storage compartment 52 is a box-like unit having a top wall 54, a bottom wall 56, side walls 58 and 60, a rear wall 62 and a front wall 64. The vegetable-storage compartment 52 is also provided with a front door 66 having a peripheral seal 68 engageable with the front wall 64 to seal the interior of the vegetable-storage compartment relative to the refrigerated compartment 44. This prevents the escape of water vapor from the vegetable-storage compartment 52 into the refrigerated compartment 44.

In the particular construction illustrated, the vegetable-storage compartment 52 is shown as positioned between the upper and lower ends of the refrigerated compartment 44, although it may be located at the bottom of the refrigerated compartment if desired. To provide good heat transfer between the refrigerated compartment 44 and the interior of the vegetable-storage compartment 52, at least the top and bottom walls 54 and 56 of the vegetable-storage compartment are made of a material, such as aluminum, having a high heat conductivity. This insures that the temperature within the vegetable-storage compartment 52 will be maintained substantially within the same range as the temperature within the refrigerated compartment 44. If desired, some or all of the other walls of the vegetable-storage compartment 52 may be made of the same material as the top and bottom walls 54 and 56. The door 66 may also be made of this material, or it can be transparent for viewing of the contents of the vegetable-storage compartment 52.

Seated on and coextensive with the bottom of the vegetable-storage compartment 52 is a water tray 70 corresponding to the water tray 30. The tray 70 is filled with water to a level at least three-quarters full. Within the vegetable-storage compartment 52 above the water tray 70 are shelves 72, preferably of the wire rack type.

The operation of the vegetable-storage compartment 52 in the refrigerator 40 is similar to the operation of the vegetable-storage compartment 22 in the refrigerator 10 so that a detailed description is not necessary. Suffice it to say that the desired conditions of temperature and humidity are maintained in the vegetable-storage compartment 52 without any possibility of the escape of water vapor from the vegetable-storage compartment into the remainder of the refrigerated compartment 44. Thus, the desired condition of a saturated atmosphere within the vegetable-storage compartment 52 is achieved without raising the humidity of the atmosphere in the remainder of the refrigerated compartment 44.

Although exemplary embodiments of the invention have been disclosed herein for purposes of illustration, it will be understood that various changes, modifications and substitutions may be incorporated in such embodiments without departing from the spirit of the invention as defined by the claims which follow.

I claim as my invention:

1. In an apparatus for minimizing deterioration of vegetables during prolonged refrigerated storage, the combination of:
   (a) a refrigerating apparatus having a refrigerated compartment and means for maintaining the temperature in said refrigerated compartment within a temperature range of from about 34° F. to about 38° F.;
   (b) a vegetable-storage compartment separated from said refrigerated compartment by a wall having a high coefficient of heat conductivity so that it conducts heat freely from said vegetable-storage compartment to said refrigerated compartment;
   (c) said vegetable-storage compartment being substantially sealed relative to said refrigerated compartment so as to substantially prevent the passage of water vapor from said vegetable-storage compartment to said refrigerated compartment;
   (d) a tray within said vegetable-storage compartment and adapted to be filled with water to a predetermined level so as to maintain the air in said vegetable-storage compartment substantially saturated with water vapor; and
   (e) at least one vegetable-storage rack within said vegetable-storage compartment.

2. An apparatus as defined in claim 1 wherein said tray is substantially coextensive with said vegetable-storage compartment in a horizontal plane.

3. An apparatus according to claim 2 wherein said tray is located at the bottom of said vegetable-storage compartment and wherein said rack is located in said vegetable-storage compartment above the water level in said tray.

4. An apparatus as set forth in claim 3 wherein said vegetable-storage compartment is located within and occupies a part of said refrigerated compartment and is separated from the remainder of said refrigerated compartment by said wall.

5. An apparatus as defined in claim 4 wherein said vegetable-storage compartment is provided with a door and means for substantially sealing said door when it is in its closed position so as to substantially prevent the escape of water vapor from said vegetable-storage compartment.

6. An apparatus according to claim 4 wherein said vegetable-storage compartment is a separate unit installable in and removable from said refrigerated compartment.

References Cited

UNITED STATES PATENTS

| | | | |
|---|---|---|---|
| 2,100,992 | 11/1937 | Woodhead et al. | 62—441 X |
| 2,238,635 | 4/1941 | Fletcher | 62—441 |
| 2,709,900 | 6/1955 | Zearfoss et al. | 62—382 X |
| 3,077,749 | 2/1963 | Jung et al. | 62—441 X |
| 3,203,199 | 8/1965 | Stewart | 62—441 X |
| 3,241,334 | 3/1966 | Amore | 62—382 |

LLOYD L. KING, *Primary Examiner.*